(12) United States Patent
Xu et al.

(10) Patent No.: US 9,951,170 B2
(45) Date of Patent: Apr. 24, 2018

(54) SULFONATED POLYPHOSPHAZENE COPOLYMER PROTON EXCHANGE MEMBRANE MATERIAL AND METHOD FOR PREPARING SUCH MEMBRANE

(71) Applicant: Hulin Xu, Beijing (CN)

(72) Inventors: Hulin Xu, Beijing (CN); Changjin Zhu, Beijing (CN)

(73) Assignee: Hulin Xu, Beijing (CN)

( * ) Notice: Subject to any disclaimer, the term of this patent is extended or adjusted under 35 U.S.C. 154(b) by 0 days.

(21) Appl. No.: 15/033,829

(22) PCT Filed: Mar. 20, 2015

(86) PCT No.: PCT/CN2015/074660
§ 371 (c)(1),
(2) Date: May 2, 2016

(87) PCT Pub. No.: WO2016/106979
PCT Pub. Date: Jul. 7, 2016

(65) Prior Publication Data
US 2016/0340460 A1  Nov. 24, 2016

(30) Foreign Application Priority Data

Dec. 29, 2014 (CN) .......................... 2014 1 0839947

(51) Int. Cl.
*C08F 283/00* (2006.01)
*C08J 5/22* (2006.01)
(Continued)

(52) U.S. Cl.
CPC ............ *C08F 283/00* (2013.01); *B01J 39/19* (2017.01); *C08F 8/12* (2013.01); *C08F 8/36* (2013.01);
(Continued)

(58) Field of Classification Search
USPC .......................................... 521/27; 429/494
See application file for complete search history.

(56) References Cited

U.S. PATENT DOCUMENTS 5,344,560 A * 9/1994 Sugo ...................... B01D 15/00
210/500.23
6,365,294 B1 * 4/2002 Pintauro ................ C08J 5/2256
429/314
(Continued)

FOREIGN PATENT DOCUMENTS

| CN | 1640895 A | 7/2005 |
|---|---|---|
| CN | 103626923 A | 3/2014 |

(Continued)

*Primary Examiner* — Mark Kaucher
*Assistant Examiner* — Henry Hu
(74) *Attorney, Agent, or Firm* — Andrew W. Chu; Craft Chu PLLC

(57) ABSTRACT

A sulfonated polyphosphazene copolymer proton exchange membrane material, and a method for preparing such membrane includes a macromolecule initiator as bromo polyphosphazene is subjected to atom transfer radical polymerization with styrene, yielding a graft copolymer, which is hydrazinolyzed with hydrazine hydrate resulting in a copolymer including a hydroxyl group. The copolymer is reacted with 1,4-butane sultone to yield a sulfonated copolymer finally. The polymer is cross-linked with 2,6-di(hydroxymethyl)-4-methyl phenol (BHMP) as a cross linking agent in the presence of methyl sulfonic acid, yielding cross-linked proton exchange membrane. Such cross-linked graft copolymer membrane has high proton conductivity, low methanol hindrance, and low cost, and has ideal effect when applied in fuel cells as proton exchange membrane material.

1 Claim, 6 Drawing Sheets

(51) Int. Cl.

| | |
|---|---|
| *C08F 212/14* | (2006.01) |
| *C08F 8/12* | (2006.01) |
| *C08F 8/36* | (2006.01) |
| *H01M 2/16* | (2006.01) |
| *H01M 8/02* | (2016.01) |
| *H01M 8/103* | (2016.01) |
| *H01M 8/1034* | (2016.01) |
| *C08G 79/025* | (2016.01) |
| *B01J 39/19* | (2017.01) |
| *H01M 8/1018* | (2016.01) |

(52) U.S. Cl.
CPC .......... *C08F 212/14* (2013.01); *C08G 79/025* (2013.01); *C08J 5/22* (2013.01); *C08J 5/2268* (2013.01); *C08J 5/2287* (2013.01); *H01M 2/16* (2013.01); *H01M 8/02* (2013.01); *H01M 8/103* (2013.01); *H01M 8/1034* (2013.01); *C08F 2438/01* (2013.01); *C08F 2500/26* (2013.01); *C08F 2810/20* (2013.01); *C08J 2325/08* (2013.01); *C08J 2351/08* (2013.01); *C08J 2385/02* (2013.01); *H01M 2008/1095* (2013.01)

(56) References Cited

U.S. PATENT DOCUMENTS

| | | | | |
|---|---|---|---|---|
| 2010/0227247 | A1* | 9/2010 | Pintauro | H01M 8/1023 429/479 |
| 2012/0029154 | A1* | 2/2012 | Deetz | B01J 20/264 525/327.3 |
| 2012/0237850 | A1* | 9/2012 | Kim | H01M 8/1027 429/494 |

FOREIGN PATENT DOCUMENTS

| | | | |
|---|---|---|---|
| CN | 103642235 | * | 3/2014 |
| CN | 103642235 A | | 3/2014 |
| WO | 2013 147520 A1 | | 10/2013 |

* cited by examiner

SULFONATED POLYPHOSPHAZENE COPOLYMER PROTON EXCHANGE MEMBRANE MATERIAL AND METHOD FOR PREPARING SUCH MEMBRANE

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention pertains to fields of high polymer chemistry and material chemistry, more particularly relates to a new proton exchange membrane material of polyphosphazene-graft-sulfonated polystyrene, and a method for preparing such proton exchange membrane.

2. Description of Related Art Including Information Disclosed Under 37 CFR 1.97 and 37 CFR 1.98

Proton exchange membranes play a key role in fuel cells, which separate oxidants from fuel while providing channels for proton transport. Currently, commercial proton exchange membranes are perfluoro sulfonic acid membranes typified by Nafion from Du Pont Co. Such membrane has high proton conductivity, as well as good chemical stability and oxidation resistance. However, perfluoro sulfonic membrane has drawbacks such as a low methanol hindrance, intolerance of high temperature and high cost, which limit such membrane widely commercially applied as proton exchange membrane.

During the last years, materials have been developed to replace perfluoro sulfonic acid for preparing proton exchange membrane, including proton exchange membrane materials of various aryl carbonhydrogen polymers, such as sulfonated poly(aryl ether ketone), sulfonated polyimides and sulfonated poly(aryl ether sulfone). Typically, these membrane materials have high temperature stability, low fuel permeability and low cost. However, these sulfonated aromatic polymer membranes often have low proton conductivity due to the low acidity of the aryl sulfonic acids in the polymers. A method to improve the performances of proton exchange membrane is to design the structural constituents of the polymer material to incorporate in detailed ion transporting channels in order to achieve an efficient conduction for proton. Based on the above-detailed background, a new copolymer material comprising a polyphosphazene graft co-polystyrene backbone and a flexible aliphatic sulfonate branch side chain is designed and prepared, and the copolymer is cross-linked which results in proton cross-linked membranes with various proton exchange capacities (IECs).

BRIEF SUMMARY OF THE INVENTION

An object of the present invention is to provide a polyphosphazene-type proton exchange membrane material with high proton conductivity, low methanol permeability and low cost, and a method for preparing such membrane. The proton conductivity, methanol hindrance, heat stability, oxidation resistance, swelling degree, water uptake, and the like of the proton exchange membranes prepared are measured experimentally, and the results demonstrate that the materials of the present invention and the proton exchange membrane made from such materials have potentials in fuel cell applications.

[In a first aspect of the present invention, a sulfonated polyphosphazene polystyrene graft copolymer material having the following structural formula is provided.

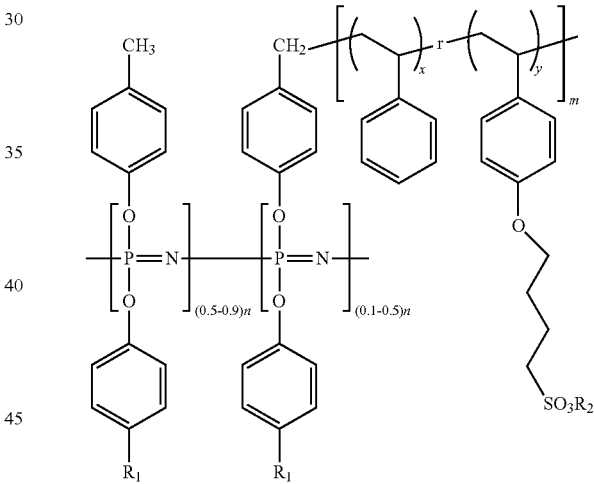

wherein R1 is —OCH3 or —F; R2 is Na or H; n is the number of phosphazene residue units, i.e. the length of a polyphosphazene chain; x is the number of styrene residue units, and ranges from 0 to 100; y is the number of p-(4-sulfonato butoxy) styrene residue units, and ranges from 0 to 100; m is the number of combination units of styrene residues and p-(4-sulfonato butoxy) styrene residues, and ranges from 0 to 100; r indicates that the copolymer of styrene residue and p-(4-sulfonato butoxy) styrene residue is a random copolymer.

In a second aspect of the present invention, a method for preparing the sulfonated polyphosphazene polystyrene graft copolymer material having the above structure is provided, comprising the steps of:

(1) dichloro phosphazene (a) is dissolved in 1,4-dioxane, then sodium p-methoxy phenolate or sodium p-fluoro phenolate is added, and reacted by heating under refluxing for 24 hrs, then sodium p-methyl phenolate is added to advance the reaction until the substitution reaction is completed, and product (b) thus obtained is poly(4-methoxy phenoxy)(4- methyl phenoxy)phosphazene or poly(4-fluoro phenoxy)(4-methyl phenoxy) phosphazene, in the reaction equation, R is —OCH3 or —F; n is the number of phosphazene residue units, i.e. the length of a polyphosphazene chain.

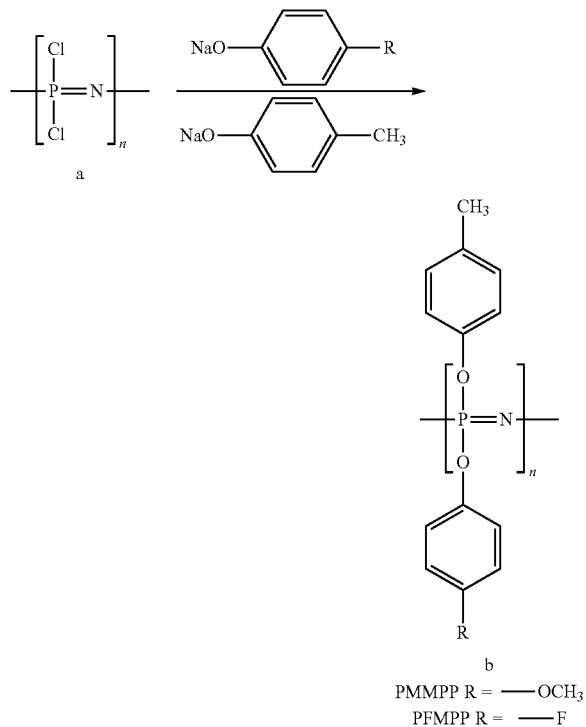

b
PMMPP R = —OCH$_3$
PFMPP R = —F (2) compound b obtained as above and N-bromo succinimide (NBS) are heated under refluxing with carbon tetrachloride being a solvent and benzoyl peroxide (BPO) being an initiator, to perform a bromination reaction, and compound (c) obtained, i.e. bromo polyphosphazene. in the reaction equation, R is —OCH3 or —F; n is the number of phosphazene residue units, i.e. the length of a polyphosphazene chain.

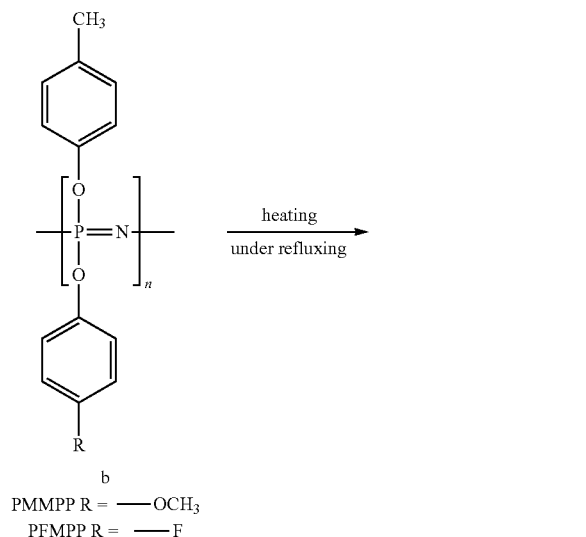

b
PMMPP R = —OCH$_3$
PFMPP R = —F

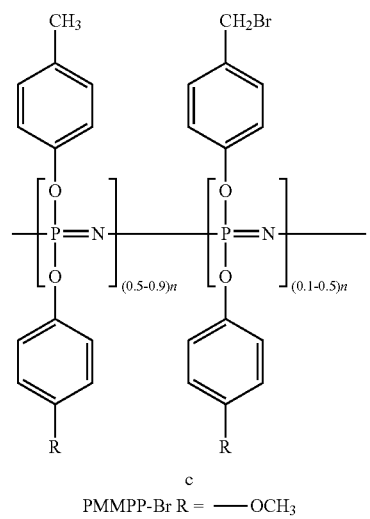

c
PMMPP-Br R = —OCH$_3$
PFMPP-Br R = —F (3) compound c obtained as above, styrene and 4-acetyloxy styrene are used as raw materials and subjected to atom transfer radical polymerization in a solvent of methylbenzene or 1,4-dioxane under refluxing in the presence of a catalyst 2,2-bipyridine, yielding graft copolymer (d) with various ratios of the number (x) of styrene residue units to the number (y) of 4-acetyloxy styrene residue units, i.e. poly(4-methoxy phenoxy)(4-methyl phenoxy)phosphazene-graft-poly[styrene-co-(4-acetyloxy)styrene] (M-PSx-PASy) or poly(4-fluoro phenoxy)(4-methyl phenoxy)phosphazene-graft-poly[styrene-co-(4-acetyloxy)styrene] (F-PSx-PASy). Finally, the final molar ratio of styrene to 4-acetyloxy styrene in the resulting product is obtained by 1H NMR analysis.

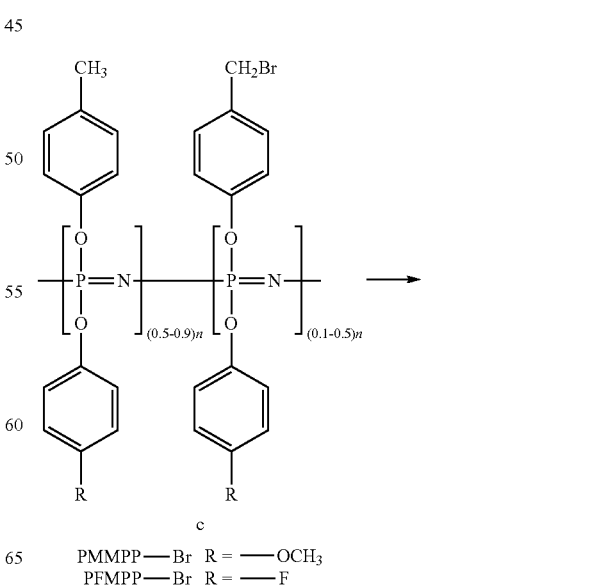

c
PMMPP—Br R = —OCH$_3$
PFMPP—Br R = —F

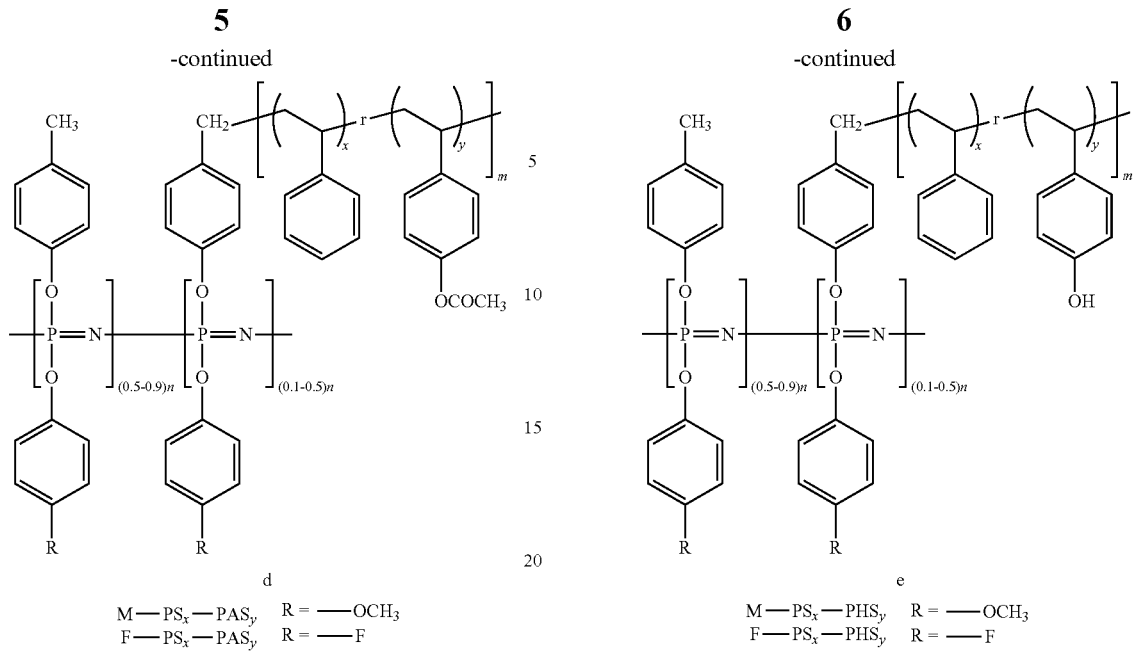

M—PSx—PASy    R = —OCH3
F—PSx—PASy    R = —F (4) compound d obtained above is reacted with hydrazine hydrate in a solvent of tetrahydrofuran, yielding macromolecular compound (e) which has a phenolic hydroxy group, i.e. poly(4-methoxy phenoxy)(4-methyl phenoxy)phosphazene-graft-poly[styrene-co-(4-hydroxy)styrene] (M-PSx-PHSy) or poly(4-fluoro phenoxy)(4-methyl phenoxy)phosphazene-graft-poly[styrene-co-(4-hydroxy)styrene] (F-PSx-PHSy).

(5) compound e obtained above is reacted with 1,4-butane sultone in a solvent of dimethylsulfoxide, and compound (f) thus obtained is polyphosphazene-type proton exchange membrane material (f), i.e. poly(4-methoxy phenoxy)(4-methyl phenoxy) phosphazene-graft-poly{(styrene)x-co-[4-(4-sulfonato butoxy)styrene]y} (M-PSx-PSBOSy) or poly(4-fluoro phenoxy)(4-methyl phenoxy)phosphazene-graft-poly{(styrene)x-co-[4-(4-sulfonato butoxy)styrene]y} (F-PSx-PSBOSy).

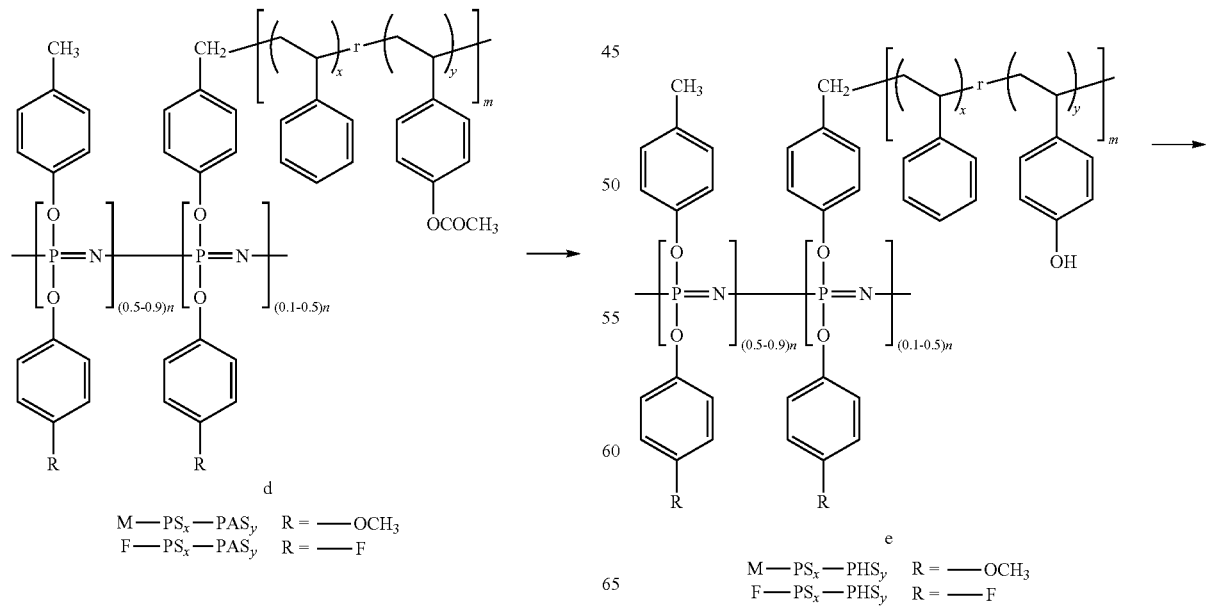

M—PSx—PASy    R = —OCH3
F—PSx—PASy    R = —F

M—PSx—PHSy    R = —OCH3
F—PSx—PHSy    R = —F

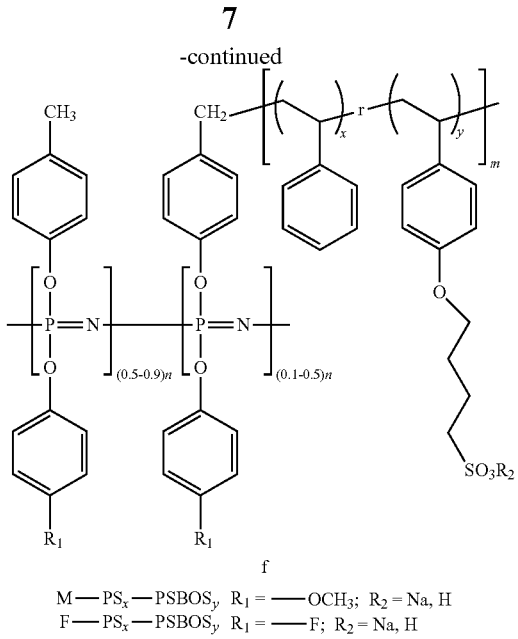

M—PS$_x$—PSBOS$_y$, R$_1$ = —OCH$_3$; R$_2$ = Na, H
F—PS$_x$—PSBOS$_y$, R$_1$ = —F; R$_2$ = Na, H

Wherein R1, R2, n, x, y, m and r are defined as above.

In a third aspect of the present invention, a method for preparing a sulfonated polyphosphazene polystyrene graft copolymer proton exchange membrane is provided. The above sulfonated polyphosphazene polystyrene graft copolymer material is cross-linked in the presence of methanesulfonic acid. Then the sulfonated polyphosphazene copolymer proton exchange membrane is prepared through film forming by solution casting method. The membrane has superior heat stability and oxidation resistance, as well as superior proton conductivity, however, its methanol permeability is much lower than Nafion117 membrane.

The present invention has the following advantages:

a series of polyphosphazene graft polystyrene copolymer materials comprising an aliphatic sulfonate branch side chain, M-PSx-PSBOSy and F-PSx-PSBOSy, and a proton exchange membrane is obtained by cross-linking such materials. Proton conductivities of most membranes are higher than Nafion. In the condition of humidity 100% and 80° C., proton conductivities ranges of M-PSx-PSBOSy and F-PSx-PSBOSy are 0.184 S/cm to 0.266 S/cm and 0.147 S/cm to 0.284 S/cm, respectively. Methanol permeability coefficients of the membranes range from $1.60 \times 10^{-7}$ cm2/s to $10.4 \times 10^{-7}$ cm2/s, which is lower than Nafion 117. Fenton experiments demonstrate that the proton exchange membranes have higher oxidation resistance. The above advantages show that the sulfonated polyphosphazene graft polystyrene copolymer material of the present invention and the proton exchange membrane prepared from the same have favorable proton conductivity, methanol hindrance and oxidation resistance, which makes them useful in manufacturing the proton exchange membrane of fuel cells.

DETAILED DESCRIPTION OF THE INVENTION

The present invention is further illustrated in combination with Examples hereinafter. The Examples are for illustration purposes only, and are not intended to limit the scope of the present invention in any way. All parameters and descriptions in Examples are based on mass, unless otherwise stated. In Examples, testing methods that are not specifically noted with operating conditions are carried out under conventional conditions known to the skilled ones of the art, or according to manufacturers' recommendations.

All technical and scientific terms used herein have the same meaning as is commonly understood by one of ordinary skilled in the art, unless defined otherwise. Furthermore, any methods and materials that is similar with or equal to those recited herein can be applied in methods of the present invention.

In order to make the above-mentioned objects and advantages of the present invention more apparent, the following detailed description of the present invention is made by combining accompanying drawings and specifical embodiments.

Example 1

Poly[(4-methoxy phenoxy)(4-methyl phenoxy)phosphazene-graft-poly{(styrene)10-co-[4-(4-sulfonato butoxy)styrene]17} (M-PS10-PSBOS17).

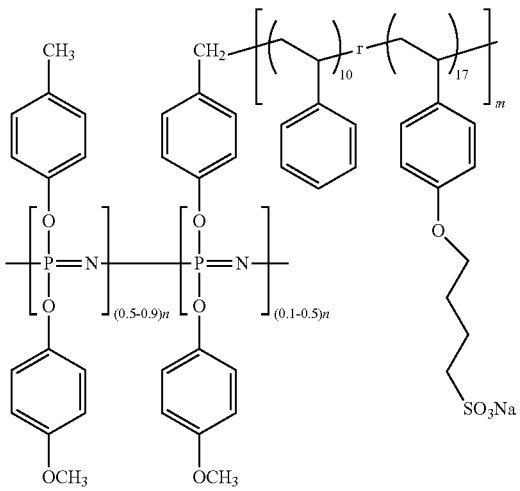

Figure 1:
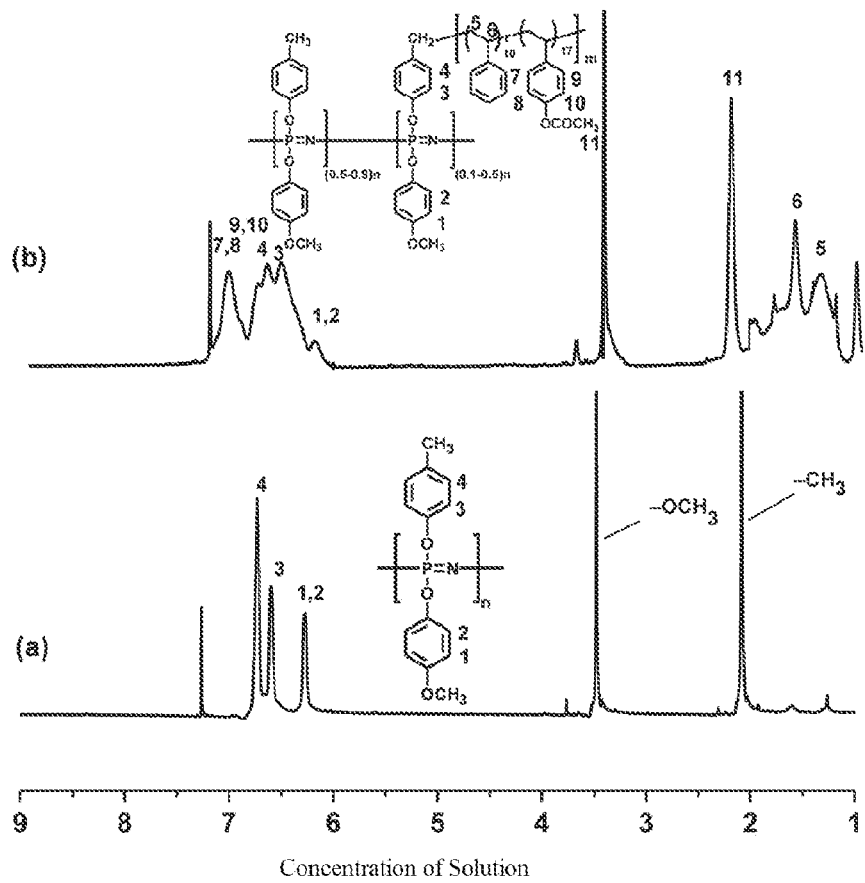
FIGS. 1a and 1b are 1H NMR spectra of poly[(4-methoxy phenoxy)(4-methyl phenoxy)phosphazene] (PMMPP) and poly[(4-methoxy phenoxy)(4-methyl phenoxy)phosphazene-graft-poly{(styrene)$_{10}$-co-[(4-acetyloxy)styrene]$_{17}$} (M-PS$_{10}$-PAS$_{17}$) of the application, respectively.

Hexachloro cyclotriphosphazene was ring opening polymerized at 250° C. yielding poly(dichloro phosphazene) (PDCP). Poly(dichloro phosphazene) (5 g, 43 mmol) was dissolved in 80 mL 1,4-dioxane; 4-methoxy phenol (5.33 g, 43 mmol) was dissolved in 60 mL 1,4-dioxane, sodium hydride (1.72 g, 43 mmol) and n-butylammonium bromide (0.33 g, 1 mmol) were added, and the reaction mixture thus obtained was refluxed overnight, yielding a sodium salt. The obtained salt solution was added dropwise into a solution of poly(dichloro phosphazene) with stirring, and the reaction mixture was heated under refluxing under argon protection for 24 hrs. Then 1,4-dioxane solution comprising sodium 4-methyl phenolate was added dropwise. The sodium 4-methyl phenolate was obtained as follows: 4-methyl phenol (9.29 g, 86 mmol) was dissolved in 1,4-dioxane, and sodium hydride (3.44 g, 86 mmol) was added, then heated under refluxing. The reaction mixture was heated under refluxing at 115° C. for 36 hrs. Precipitate was resulted after adding water to the reaction solution, which was then vacuum dried for 24 hrs, the resulting product was dissolved in tetrahydrofuran, into which water was added to form precipitate. Finally, the product was dissolved in tetrahydrofuran, into which n-hexane was added to form precipitate, yielding a white fibrous macromolecular compound, i.e. poly[(4-methoxy phenoxy)(4-methyl phenoxy)phosphazene] (PMMPP). The yield is 50%. The $^1$H NMR spectrum of the obtained macromolecular compound was shown in FIG. 1a. $^1$H MNR (400 MHz, CDCl$_3$; ppm): δ: 6.6-6.8 (m, —OC$_6$H$_4$CH$_3$), 6.28 (m, —OC$_6$H$_4$OCH$_3$), 3.48 (s, —OCH$_3$), 2.08 (s, CH$_3$).

PMMPP (1.0 g, 3.6 mmol), N-bromo succinimidyl (0.128 g, 0.72 mmol), benzoyl peroxide (0.017 g, 0.072 mmol) and carbon tetrachloride (100 mL) were added into a 200 mL round flask under nitrogen protection, and the obtained mixture was refluxed at 80° C. for 3 hrs. Then, the mixture was cooled and filtered. The filtrate was added to n-hexane, and the product was precipitated, which was then dried in vacuum at 50° C. for 24 hrs. The macromolecule initiator, bromo polyphosphazene (PMMPP-Br), was obtained. The yield is 90%. $^1$H MNR (400 MHz, CDCl$_3$; ppm): δ: 6.6-6.8 (m, —OC$_6$H$_4$CH$_3$), 6.28 (m, —OC$_6$H$_4$OCH$_3$), 4.2 (s, —CH$_2$Br), 3.48 (s, —OCH$_3$), 2.08 (s, CH$_3$).

The macromolecule initiator PMMPP-Br (0.5 g, 0.26 mmol), styrene (1.083 g, 10.4 mmol), 4-acetyloxy styrene (1.68 g, 10.4 mmol), 2,2-bipyridyl (0.24 g, 1.56 mmol) and copper bromide (0.52 mmol) were added into a dry reaction tube equipped with a piston and a magnetic stirrer. The polymerization was performed at 115° C. for 24 hrs. Then, the resulting mixture was purified through column chromatography and vacuum drying. The graft copolymer of poly[(4-methoxy phenoxy)(4-methyl phenoxy)phosphazene-graft-poly{(styrene)$_{10}$-co-[(4-acetyloxy)styrene]$_{17}$} (M-PS$_{10}$-PAS$_{17}$) was obtained. The 1H NMR spectrum of the obtained compound was shown in FIG. 1b. $^1$H MNR (400 MHz, CDCl$_3$; ppm): δ: 7.08-7.26 (m, —OC$_6$H$_4$), 6.6-6.8 (m, —OC$_6$H$_4$CH$_3$), 6.28 (m, —OC$_6$H$_4$OCH$_3$), 3.48 (s, —OCH$_3$), 2.26 (s, —OOCCH$_3$), 2.08 (s, CH$_3$), 1.2-1.9 (m, CH$_2$, CH).

Figure 2A:
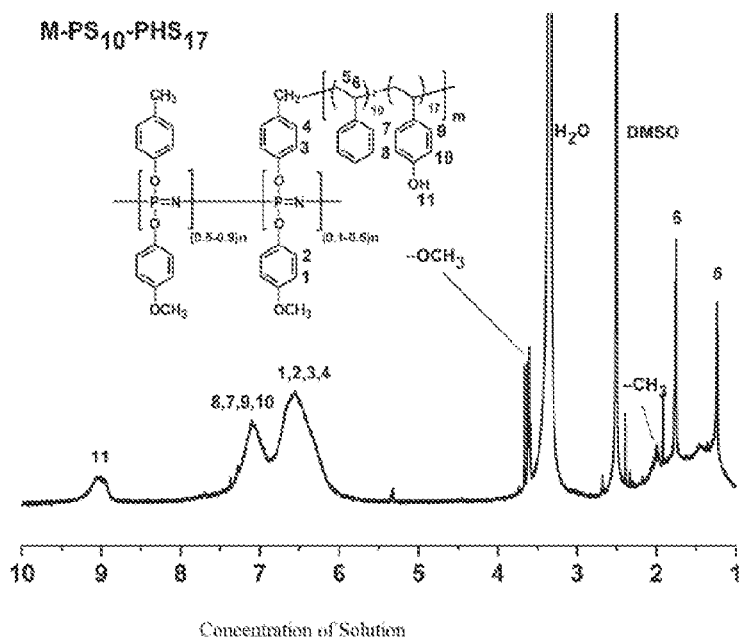
FIGS. 2a and 2b are $^1$H NMR spectra of poly[(4-methoxy phenoxy)(4-methyl phenoxy)phosphazene-graft-poly{(styrene)$_{10}$-co-[(4-hydroxy)styrene]$_{17}$} and poly[(4-methoxy phenoxy)(4-methyl phenoxy)phosphazene-graft-poly{(styrene)$_{10}$-co-[(4-(4-sulfonato butoxy)styrene]$_{17}$} (M-PS$_{10}$-PSBOS$_{17}$) of the application, respectively.

Poly[(4-methoxy phenoxy)(4-methyl phenoxy)phosphazene-graft-poly{(styrene)$_{10}$-co-[(4-acetyloxy)styrene]$_{17}$} (M-PS$_{10}$-PAS$_{17}$) (1.0 g, 3.6 mmol) was dissolved in tetrahydrofuran, and 2.0 mL hydrazine hydrate was added. The reaction mixture was stirred under nitrogen at room temperature for 5 hrs. After the reaction completed, the resulting mixture was precipitated from water, then dried at 60° C. for 24 hrs, yielding the product, poly[(4-methoxy phenoxy)(4-methyl phenoxy)phosphazene-graft-poly{(styrene)$_{10}$-co-[(4-hydroxy)styrene]$_{17}$} (M-PS$_{10}$-PHS$_{17}$). Yield: 80%. The $^1$H NMR spectrum of the obtained compound was shown in FIG. 2a. $^1$H MNR (400 MHz, DMSO-d6, ppm): δ: 9.04 (s, —OH), 7.08-7.26 (m, —OC$_6$H$_4$), 6.28-6.8 (m, —OC$_6$H$_4$CH$_3$, —OC$_6$H$_4$OCH$_3$), 3.60 (s, —OCH$_3$), 2.02 (s, CH$_3$), 1.2-1.9 (m, CH$_2$, CH).

Figure 2B:
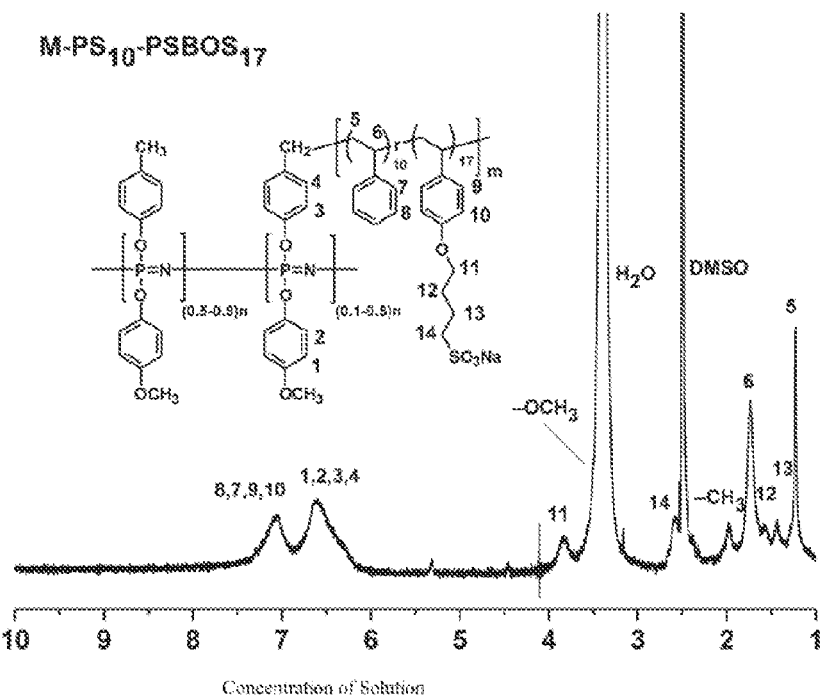

Poly[(4-methoxy phenoxy)(4-methyl phenoxy)phosphazene-graft-poly{(styrene)$_{10}$-co-[(4-hydroxy)styrene]$_{17}$} (M-PS$_{10}$-PHS$_{17}$) (0.5 g, 1.8 mmol) was dissolved in a DMSO solution, then NaH (0.052 g, 2.16 mmol) was added. The reaction mixture was stirred at 40° C. for 24 hrs, then 1,4-butane sultone (0.25 g, 0.18 mL) was added into the reaction system. The resulting mixture was stirred at 100° C. for 24 hrs, then added into isopropanol, from which a polymer was precipitated. The isolated polymer was dried in vacuum at 80° C. for 10 hrs, yielding the product poly[(4-methoxy phenoxy)(4-methyl phenoxy)phosphazene-graft-poly{(styrene)$_{10}$-co-[4-(4-sulfonato butoxy)styrene]$_{17}$} (M-PS$_{10}$-PSBOS$_{17}$). Yield: 90%. The $^1$H NMR spectrum of the compound obtained was shown in FIG. 2b.

Example 2

Poly[(4-fluoro phenoxy)(4-methyl phenoxy)phosphazene-graft-poly{(styrene)$_x$-co-[4-(4-sulfonato butoxy) styrene]$_y$} (F-PS$_x$-PSBOS$_y$).

The preparation was performed as described in Example 1, except that sodium 4-fluoro phenolate was substituted for sodium 4-methoxy phenolate in Example 1.

Table 1 shows the molecular weight of two series of graft copolymer obtained respectively in Example 1 and Example 2, the GPC results (Table 1) indicating that polymers of high molecular weights are obtained.

| Graft Copolymer | Length of Graft $(P_s/P_{4As})^a$ | $M_n$ (Da)$^b$ | $M_w$ (Da)$^b$ | PDI |
|---|---|---|---|---|
| M-PS$_{10}$-PAS$_{11}$ | 10:11 | 2.20 × 10$^5$ | 4.96 × 10$^5$ | 2.25 |
| M-PS$_{10}$-PAS$_{17}$ | 10:17 | 2.91 × 10$^5$ | 3.60 × 10$^5$ | 1.24 |

-continued

| Graft Copolymer | Length of Graft $(P_s/P_{4As})^a$ | $M_n$ (Da)$^b$ | $M_w$ (Da)$^b$ | PDI |
|---|---|---|---|---|
| M-PS$_{10}$-PAS$_{26}$ | 10:26 | $2.04 \times 10^5$ | $4.62 \times 10^5$ | 2.26 |
| M-PS$_8$-PAS$_{30}$ | 8:30 | $1.74 \times 10^5$ | $3.16 \times 10^5$ | 1.82 |
| M-PAS$_{40}$ | 0:40 | $1.46 \times 10^5$ | $3.11 \times 10^5$ | 2.14 |
| F-PS$_{12}$-PAS$_{11}$ | 12:11 | $4.06 \times 10^5$ | $8.60 \times 10^5$ | 2.12 |
| F-PS$_{12}$-PAS$_{17}$ | 12:17 | $8.06 \times 10^5$ | $14.64 \times 10^5$ | 1.82 |
| F-PAS$_{26}$ | 0:26 | $1.13 \times 10^5$ | $1.94 \times 10^5$ | 1.72 |

$^a$the average number of styrene units in a graft copolymer, calculated from 1H NMR spectra.
$^b$Polystyrene is used as the standard in gel permeation chromatography (GPC).

Example 3

Figure 3:
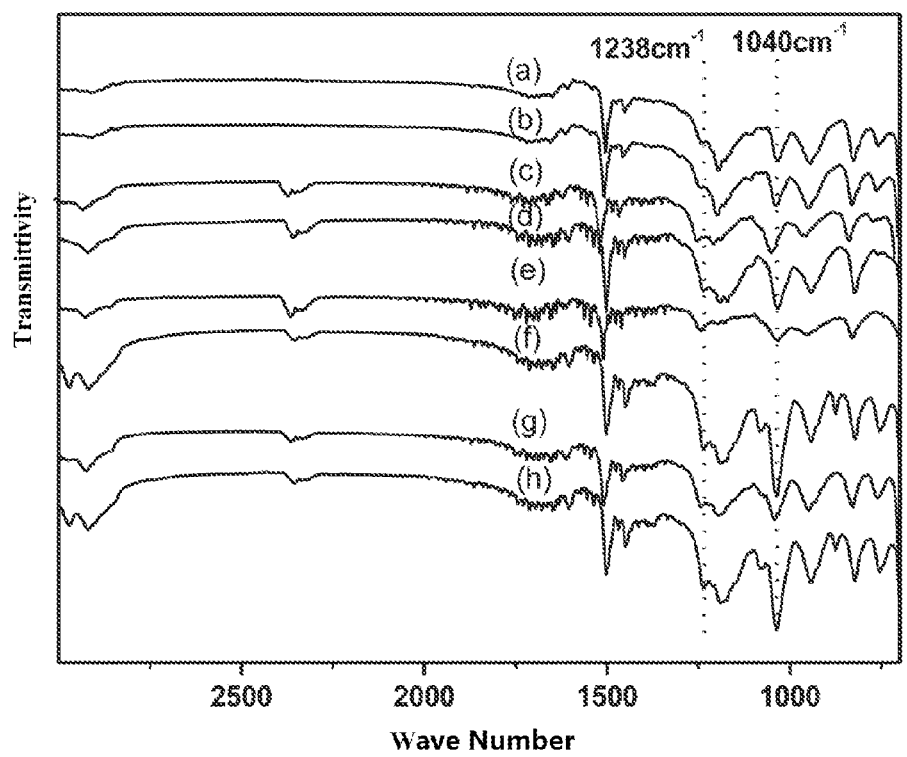
FIG. 3 is the infrared spectra of cross-linked polyphosphazene-type proton exchange membranes of the application. wherein (a)-(h), respectively, are: M-PS$_{10}$-PSBOS$_{11}$; M-PS$_{10}$-PSBOS$_{17}$; M-PS10-PSBOS26; M-PS$_8$-PSBOS$_{30}$; M-PSBOS$_{40}$; F-PS$_{12}$-PSBOS$_{11}$; F-PS$_{12}$-PSBOS$_{17}$; and F-PSBOS$_{26}$.

Sulfonated polyphosphazene graft copolymers obtained in Example 1 and Example 2 were cross-linked, yielding sulfonated polyphosphazene copolymer proton exchange membrane. The preparation process was as followed: polyphosphazene-type graft copolymer having an aliphatic sulfonate branch side chain and cross-linking agents were dissolved in DMSO, resulting a solution with concentration 10 w/v %. The solution was poured in a polytetrafluoroethylene die, and dried at 120° C. for 1 hr, then dried further at 70° C. for 24 hrs. The obtained membrane was immersed into 2 mol/L dilute sulfuric acid solution for 48 hrs, then washed with deionized water, yielding a membrane of H+ form. FIG. 3 shows the FT-IR spectrum of the membrane obtained in Example 3. It can be seen in FIG. 3 that there are two special absorptions at about 1238 cm-1 and 1040 cm-1 indicating the symmetrical and asymmetrical stretching vibrations of sulfonate groups, respectively.

Example 4

The sulfonated polyphosphazene copolymer proton exchange membrane obtained in Example 3 was subjected to a thermal analysis testing.

Figure 4:
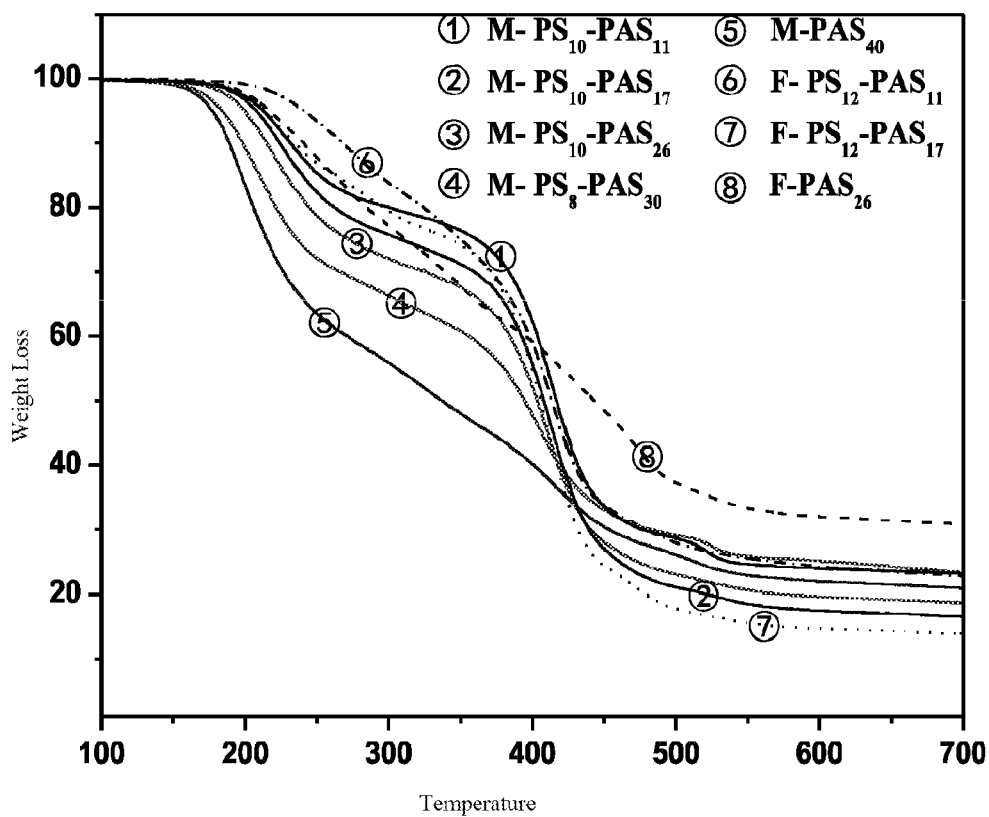
FIG. 4 shows thermal analysis curves of cross-linked polyphosphazene-type proton exchange membranes of the application.

Thermal weight losses of the polymers were analyzed on TGA-Q500 thermal analyzer, and the measuring conditions were: temperature rising at a rate of 10° C./min from 40° C. to 700° C. under a nitrogen atmosphere. FIG. 4 shows the thermo-weight curves of the membranes. All samples were heated at 100° C. for 20 min to remove residual water in the samples prior to TGA characterization. As shown in FIG. 4, there are three thermal weight loss intervals in each sample. The first thermal weight loss interval at 150-250° C. is the decomposition temperature of sulfonate group, which, in a series of membrane, rises as the styrene content increasing, indicating that the heat stability of a membrane rises gradually as the styrene content increasing. The second and the third thermal weight loss temperatures start at about 250° C. and 350° C., respectively, which are attributed to the decomposition of the polystyrene block and the polyphosphazene backbone, respectively.

Example 5

The sulfonated polyphosphazene copolymer proton exchange membrane obtained in Example 3 was subjected to an oxidation resistance testing.

Oxidation resistance testing: membrane samples were immersed in Fenton reagent (which is 3% H2O2 solution comprising 2 ppm FeSO4) at 80° C. for 1 hr, then the weight changes and physic-chemical characteristics of samples after immersed were measured. The results of oxidation resistance testing are shown in Table 2, the analysis of which indicates that the sulfonated polyphosphazene copolymer proton exchange membranes obtained according to the present invention exhibit better stability in oxidation resistance as compared with the other sulfonated polymers.

Example 6

The proton exchange capacity (IEC), water uptake and swelling degree of the sulfonated polyphosphazene copolymer proton exchange membranes obtained in Example 3 were assayed.

The assay method of proton exchange capacity (IEC): proton exchange capacity (IEC) is assayed through neutralization titration. Proton exchange membranes in the form of proton were immersed in 50 mL 2 mol/L NaCl solution for 24 hrs to sufficiently exchange H+ on sulfonate groups with Na+ from sodium chloride, then the resulting solution was titrated with 0.02 mol/L NaOH solution using phenolphthalein as a pH indicator. IEC was calculated according to the formula:

$$IEC = \frac{C_{NaOH} \times V_{NaOH}}{W}$$

CNaOH is the concentration of NaOH solution, VNaOH is the consumed volume of NaOH solution, and w is the mass of a membrane.

The method for assaying water uptake (WU): a proton exchange membrane was immersed in deionized water at room temperature for over 24 hrs to ensure the membrane had uptaken water sufficiently, the membrane was removed and swabbed with filter paper to clean the water on its surfaces, and then the membrane weight Wwet was measured immediately; after that, the membrane was baked to dry, and the membrane weight at this time Wdry was measured immediately; the water uptake of a membrane was calculated according to the formula:

$$\text{Water uptake } (\%) = \frac{W_{wet} - W_{dry}}{W_{dry}} \times 100\%$$

The assay method for the swelling degree of a membrane is as follows: the membrane was immersed in deionized water at room temperature for 24 hrs to ensure that the membrane swelled sufficiently, and its length Lwet was measured, then the membrane was dried and its length Ldry was measured; swelling degree was determined by the change in length after a membrane uptaking water, which is calculated according to the formula:

$$SW (\%) = \frac{L_{wet} - L_{dry}}{L_{dry}} \times 100\%$$

Hydration number is the average water molecules uptaken corresponding to each proton exchange site ([H2O]/[SO3-]), which is often referred as λ value and calculated according to the formula:

$$\lambda = \frac{[H_2O]}{[SO_3^-]} = \frac{WU\ (\%) \times 10}{18 \times IEC\ (\text{mmol/g})}$$

The IEC values, water uptakes, swelling degrees and hydration numbers of the sulfonated polyphosphazene copolymer proton exchange membranes are shown in Table 2.

Figure 5:
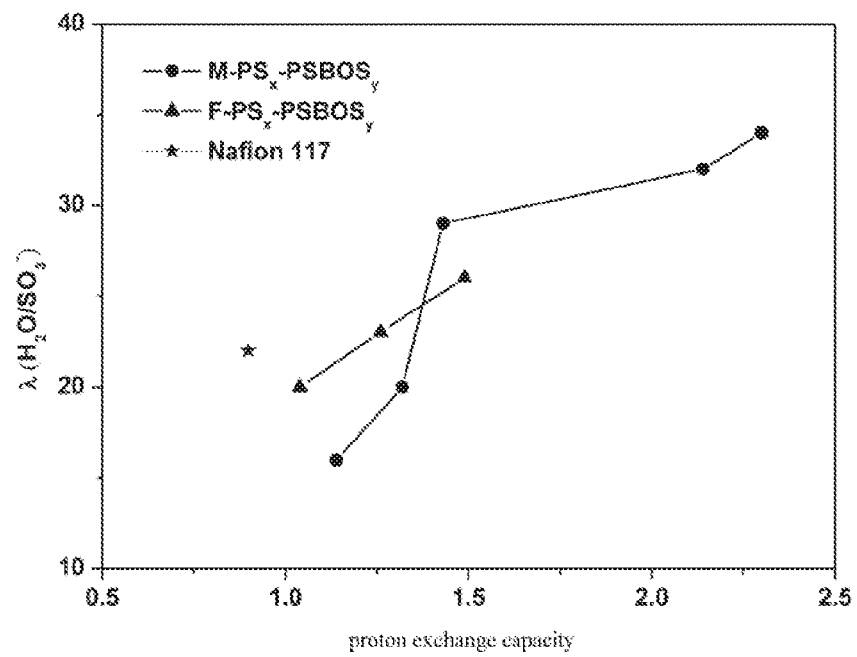
FIG. 5 shows curves of hydration number (A) of cross-linked polyphosphazene-type proton exchange membranes of the application changing over proton exchange capacity (IEC).

It can be seen in Table 2 that IEC values of all the proton exchange membranes range from 1.04 mequiv/g to 2.30 mequiv/g. The IEC value of a proton exchange membrane is related closely with its swelling degree. A membrane with a higher IEC value typically has a higher water uptake. The hydration numbers ($[H_2O]/[SO_3^-]$ or $\lambda$) of the cross-linked polyphosphazene-type graft copolymer membranes, M-$PS_x$-$PSBOS_y$, and F-$PS_x$-$PSBOS_y$, increase as their IEC values increase. FIG. 5 shows the curves of hydration numbers ($\lambda$) of sulfonated polyphosphazene copolymer proton exchange membranes changing over proton exchange capacity (IEC). The cross-linked polyphosphazene graft copolymer membranes have lower water uptakes than Nafion117.

TABLE 2

The Proton Exchange Capacities (IECs), Water Uptakes (WUs), Swelling degrees (SWs) and Hydration Numbers ($\lambda$) of the Cross-linked Polyphosphazene-type Proton Exchange Membranes and Nafion Membrane.

| polyphosphazene membrane | IEC[a] (mequiv/g) | water uptake (%) | swelling degree (%) | hydration number ($\lambda$) | RW[b] (%) |
|---|---|---|---|---|---|
| M-$PS_{10}$-$PSBOS_{11}$ | 1.14 | 33.2 | 36.8 | 16 | 98 |
| M-$PS_{10}$-$PSBOS_{17}$ | 1.32 | 48.1 | 41.1 | 20 | 96 |
| M-$PS_{10}$-$PSBOS_{26}$ | 1.43 | 74.3 | 43 | 29 | 95 |
| M-$PS_8$-$PSBOS_{30}$ | 2.14 | 128.5 | 55 | 32 | 94 |
| M-$PSBOS_{40}$ | 2.30 | 140.6 | 57.6 | 34 | 93 |
| F-$PS_{12}$-$PSBOS_{11}$ | 1.04 | 36.9 | 20.3 | 20 | 97 |
| F-$PS_{12}$-$PSBOS_{17}$ | 1.26 | 51.2 | 24 | 23 | 96 |
| F-$PSBOS_{26}$ | 1.49 | 69.5 | 27 | 26 | 94 |
| Nafion 117 | 0.9 | 35 | 17 | 22 | — |

[a]determined through titration.
[b]the mass fraction measured after immersing a membrane into Fenton reagent (3% $H_2O_2$, 2 ppm $FeSO_4$) for 1 hr.

The preparation was performed as described in Example 1, except that sodium 4-fluoro phenolate was substituted for sodium 4-methoxy phenolate in Example 1.

Example 7

The Proton Conductivity Assay of the Sulfonated Polyphosphazene Copolymer Proton Exchange Membrane Obtained in Example 3.

Proton conductivity was assayed on CHI 660D electrochemistry workstation (100 Hz~$10^5$ Hz). Calculated according to the formula:

$$\sigma = l/RS$$

wherein l is the distance in cm between electrodes; R is the electric resistance in $\Omega$ of the membrane determined by AC impedance method; S is the cross-sectional area in $cm^2$ of the proton exchange membrane; and $\sigma$ is the proton conductivity in S/cm.

Figure 6:
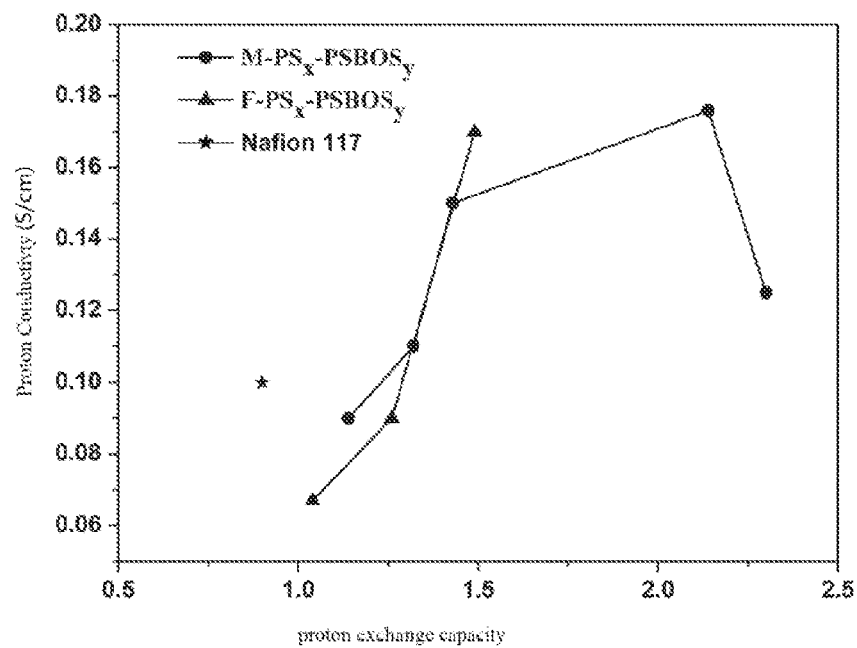
FIG. 6 shows changes of proton conductivity of cross-linked polyphosphazene-type proton exchange membranes of the application over proton exchange capacity (IEC).

Proton conductivities of the membranes are shown in Table 3. FIG. 6 shows proton conductivity changes of the sulfonated polyphosphazene copolymer proton exchange membranes over the proton exchange capacities of the membranes obtained at room temperature in Example 6. It can be seen in FIG. 6 that the proton conductivities of sulfonated polyphosphazene copolymer proton exchange membranes, M-$PS_x$-$PSBOS_y$ and F-$PS_x$-$PSBOS_y$, increase as IEC increases at room temperature, and the proton conductivities of the membranes increase substantially when IEC value ranges from 1.2 mequiv/g to 1.5 mequiv/g, indicating that IEC value has a dramatic effect on the proton conductivity of a membrane. When the IEC value is higher, the proton exchange membrane F-$PS_x$-$PSBOS_y$ has higher proton conductivity than that of M-$PS_x$-$PSBOS_y$.

TABLE 3

Proton Conductivity and Methanol Permeability of Cross-linked Polyphosphazene-type Proton Exchange Membrane.

| polyphosphazene membrane | proton conductivity (S/cm) 25° C. | proton conductivity (S/cm) 80° C. | methanol permeability coefficient ($\times 10^{-7} cm^2/s$) | selectivity[a] ($\times 10^5$ $Ss/cm^3$) |
|---|---|---|---|---|
| M-$PS_{10}$-$PSBOS_{11}$ | 0.09 | 0.184 | 2.02 | 4.46 |
| M-$PS_{10}$-$PSBOS_{17}$ | 0.11 | 0.22 | 3.78 | 2.91 |
| M-$PS_{10}$-$PSBOS_{26}$ | 0.15 | 0.26 | 4.49 | 3.34 |
| M-$PS_8$-$PSBOS_{30}$ | 0.176 | 0.266 | 7.10 | 2.47 |
| M-$PSBOS_{40}$ | 0.125 | 0.202 | 10.4 | 1.20 |
| F-$PS_{12}$-$PSBOS_{11}$ | 0.067 | 0.147 | 1.60 | 4.19 |
| F-$PS_{12}$-$PSBOS_{17}$ | 0.09 | 0.158 | 2.20 | 4.09 |
| F-$PSBOS_{26}$ | 0.17 | 0.284 | 8.50 | 2.0 |
| Nafion 117 | 0.10 | 0.191 | 15.80 | 0.63 |

[a]selectivity = proton conductivity/methanol permeability coefficient

Table 1 shows the molecular weight of two series of graft copolymer obtained respectively in Example 1 and Example 2, the GPC results (Table 1) indicating that polymers of high molecular weights are obtained.

Figure 7:
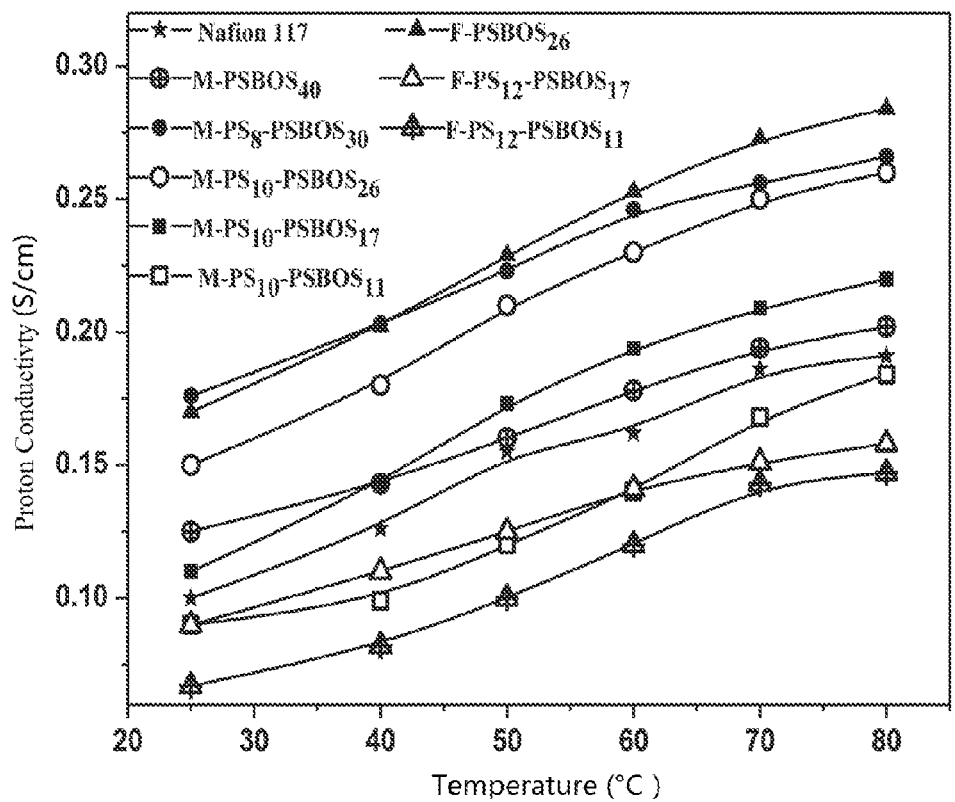
FIG. 7 shows changes of proton conductivity of cross-linked polyphosphazene-type proton exchange membranes of the application over temperature.

FIG. 7 shows changes of proton conductivity changes of the sulfonated polyphosphazene copolymer proton exchange membranes over temperature. It can be seen in FIG. 7 that proton conductivities of all the membranes increase as temperature increases. When IEC value is greater than 1.32 mequiv/g, the proton conductivities of sulfonated polyphosphazene copolymer proton exchange membranes obtained according to the present invention is greater than Nafion 117.

Example 8

Methanol Hindrance Testing of the Sulfonated Polyphosphazene Copolymer Proton Exchange Membrane Obtained in Example 3.

Methanol permeability testing of a membrane: the cell for measuring methanol permeation of a membrane was a self-designed methanol-diffusing cell, which consisted of sumps A and B; wherein sump A (VA=50 mL) was filled with 1 mol/L solution of methanol in water, sump B (VB=50 mL) was filled with deionized water, the membrane was immobilized perpendicularly between the two sumps to separate the two solutions, the methanol solution in sump A would slowly diffuse into sump B due to the interdiffusion between different kinds of fluids, then the solution in sump B was sampled periodically and the methanol content was measured through gas chromatography, and the methanol permeability coefficient of the proton exchange membrane as calculated by applying the methanol content change rate in solution B into the formula:

$$P = \frac{K \times V_B \times h}{A \times C_A}$$

wherein P is methanol permeability coefficient in $cm^2/s$; K is change rate of methanol concentration in solution B over time detected through gas chromatography. $V_B$ is the volume solution B in mL; A is available diffusing area in cm$^2$; $C_A$ is methanol concentration in mol/L in solution A; and h is the thickness in cm of the membrane.

Figure 8:
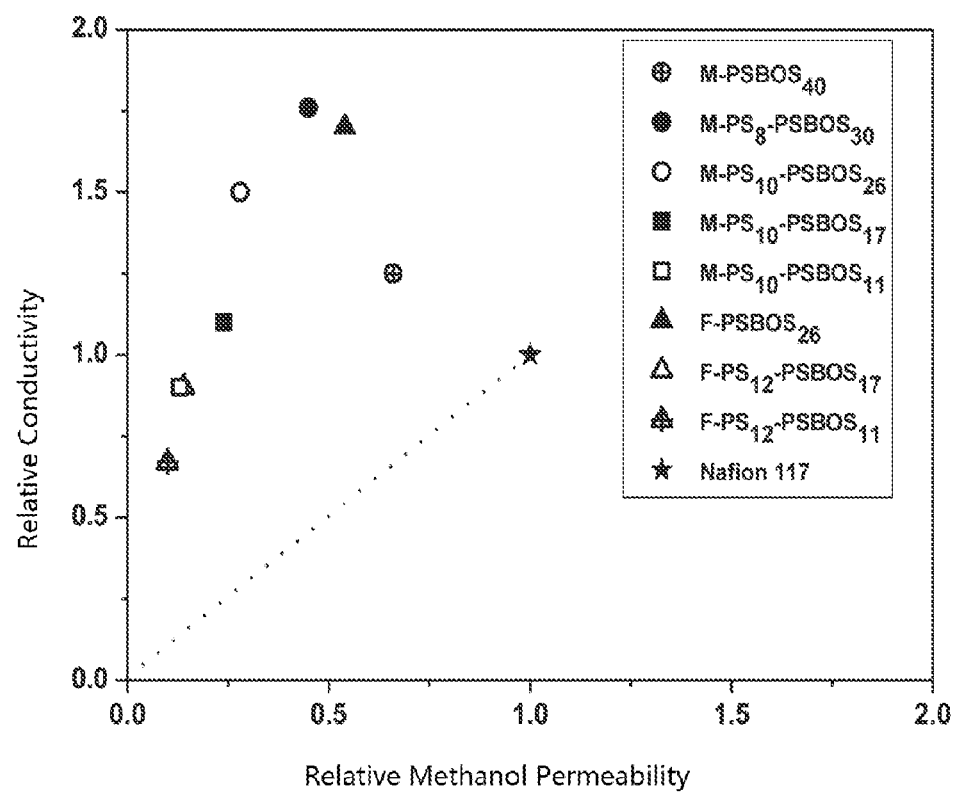
FIG. 8 is the equilibrium diagram of relative proton conductivity vs. relative methanol permeability of cross-linked polyphosphazene-type proton exchange membranes of the application.

The proton exchange membranes suitable for a methanol fuel cell need to have not only higher proton conductivity, but also lower methanol permeability coefficient. As shown in Table 3, the methanol permeability coefficients of polyphosphazene copolymer proton exchange membranes obtained according to the present invention range from $1.60\times10^{-7}$ cm$^2$/s to $10.4\times10^{-7}$ cm$^2$/s. The selectivity, which is the ratio of proton conductivity to methanol permeability coefficient and a common parameter for assessing the performance of a membrane for methanol fuel cells, of all sulfonated polyphosphazene copolymer proton exchange membranes obtained according to the present invention is higher than Nafion membrane. FIG. 8 is an equilibrium diagram of relative proton conductivity vs. relative methanol permeability of proton exchange membranes in the present Example. As shown in FIG. 8, all the membranes are positioned in the top left area, especially M-PS$_{10}$-PSBOS$_{26}$ and M-PS$_8$-PSBOS$_{30}$, which exhibit the best selectivity, and have potential for application in the proton exchange membrane of methanol fuel cells.

Example 9

Microscopic Morphology Analysis of the Sulfonated Polyphosphazene Copolymer Proton Exchange Membranes Obtained in Example 3.

Transmission electron microscopy (TEM) testing: in order to test the topological structure and the ion cluster size of a membrane, the membrane was immersed into a solution of lead nitrate in water for 3 days, then embedded into epoxy resin, sectioned to 70 nm thickness, and observed using JEOL JEM-2010 transmission electron microscope.

Figure 9A:
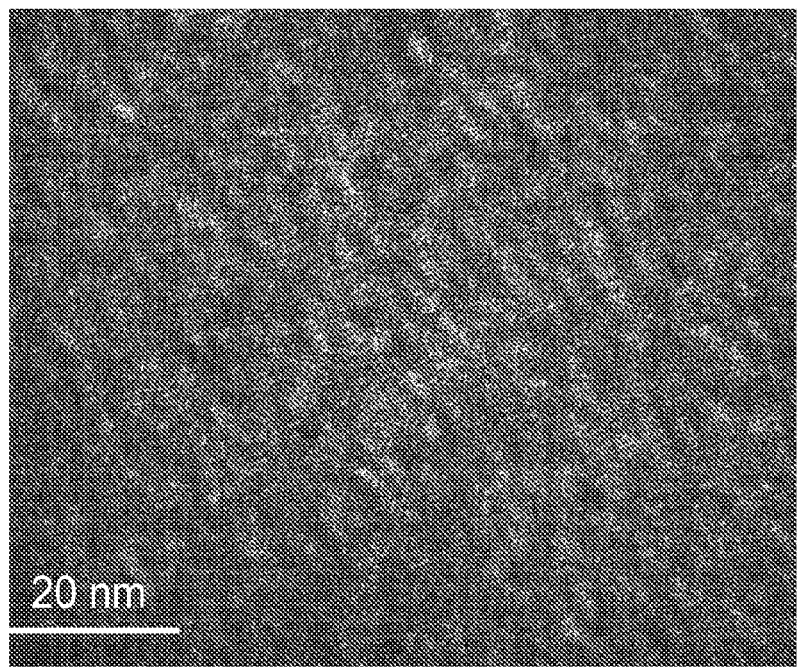
FIGS. 9a and 9b are transmission electron micrographs of polyphosphazene-type proton exchange membranes of poly [(4-fluoro phenoxy)(4-methyl phenoxy)phosphazene-graft-poly[4-(4-sulfonato butoxy)styrene]$_{26}$} (F-PSBOS$_{26}$) and poly[(4-methoxy phenoxy)(4-methyl phenoxy)phosphazene-graft-poly{(styrene)$_8$-co-[(4-(4-sulfonato butoxy)styrene]$_{30}$} (M-PS$_8$-PSBOS$_{30}$) of the application, respectively.
Figure 9B:
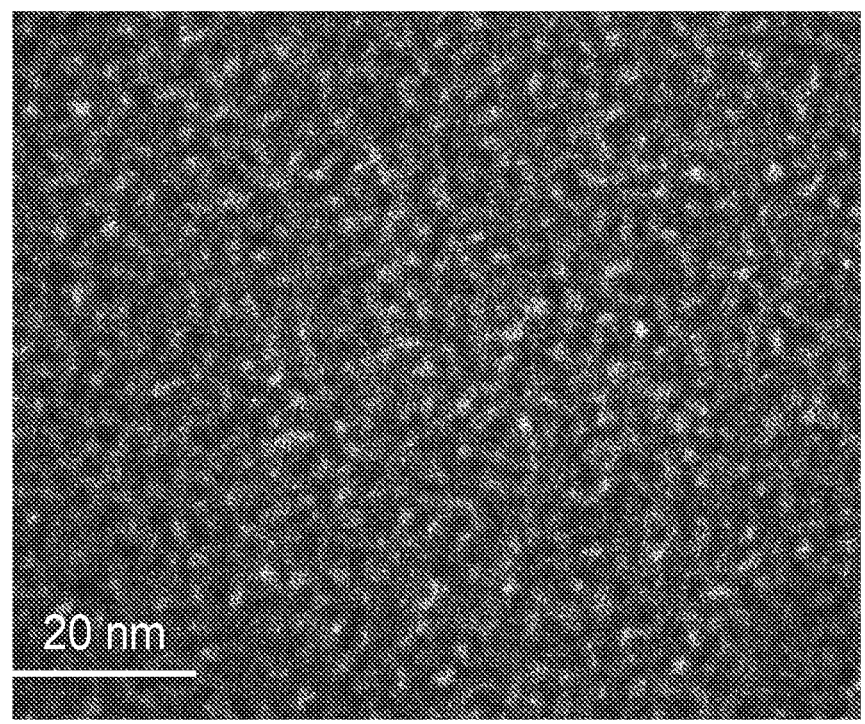

The proton conductivity of a membrane is closely related to membrane morphology. The proton transporting channel formed by a hydrophilic domain facilitates the proton transporting. FIG. 9*a* and FIG. 9*b* are the transmission electron micrographs of F-PSBOS$_{26}$ and M-PS$_8$-PSBOS$_{30}$, respectively, wherein because the membrane samples were immerse in Pb(NO$_3$)$_2$ solution prior to the test, hydrogen protons in the polymers were replaced by Pb$^{2+}$, therefore, the darker colored areas represent hydrophilic phase, and the lighter colored areas represent a hydrophobic phase. The hydrophilic/hydrophobic phase distribution on the entire membrane can be revealed by the distribution of the two colors. It's indicated in the transmission electron micrographs that ion channels that are narrow and interconnected with each other can provide the migration path for proton, which improves the proton conductivity of the polyphosphazene-type proton exchange membrane according to the present invention.

While the sulfonated polyphosphazene copolymer proton exchange membrane material provided in the present invention as well as and the preparation and the use of such membrane have been discussed in detail above, and the principles and implementations of the present invention have been illustrated through particular examples herein, the Examples above are described to help understanding the method and the core concept of the present invention only. It should be appreciated further that variations and modifications of the present invention would occur to those skilled in the art upon reading the contents above, and these equivalents are deemed to be within the scope defined by the appended claims.

We claim:

1. A chemical composition for a sulfonated polyphosphazene copolymer proton exchange membrane material, the chemical composition comprising:

a polyphosphazene-graft-sulfonated polystyrene copolymer, being comprised of a copolymer of polyphosphazene as a main chain with a polystyrene as a side chain, and a plurality of aliphatic sulfonate group grafted onto said side chain, the polyphosphazene-graft-sulfonated polystyrene copolymer having a structural formula below:

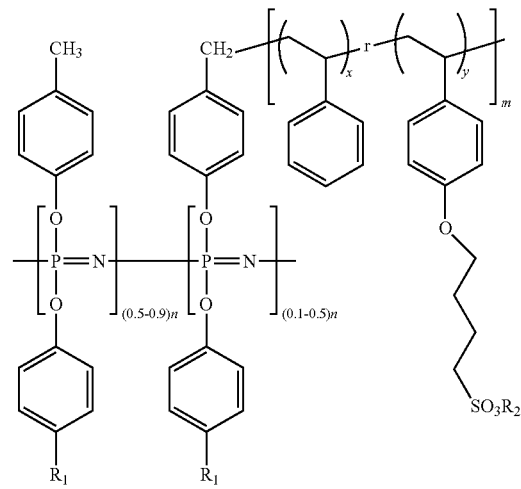

wherein R$_1$ is —OCH$_3$ or —F in para-position;
wherein R$_2$ is Na or H;
wherein n is a number of phosphazene residue units corresponding to length of a polyphosphazene chain;
wherein x is a number of styrene residue units, ranging from 0 to 100;
wherein y is a number of p-(4-sulfonato butoxy)styrene residue units, ranging from 0 to 100;
wherein m is a number of combination units of styrene residues and p-(4-sulfonato butoxy)styrene residues, ranging from 0 to 100; and
wherein r indicates that the copolymer of styrene residue and p-(4-sulfonato butoxy)styrene residue is a random copolymer.

* * * * *